April 2, 1963     J. A. HERBST     3,083,469
LEVELING DEVICE

Filed April 28, 1960     2 Sheets-Sheet 1

INVENTOR.
JOHN A. HERBST
BY
ATTORNEY

April 2, 1963     J. A. HERBST     3,083,469
LEVELING DEVICE

Filed April 28, 1960     2 Sheets-Sheet 2

INVENTOR.
JOHN A. HERBST
BY
ATTORNEY

United States Patent Office 3,083,469
Patented Apr. 2, 1963

3,083,469
LEVELING DEVICE
John A. Herbst, Lake Valhalla, Montville, N.J., assignor to Bogue Electric Manufacturing Co., Paterson, N.J., a corporation of New Jersey
Filed Apr. 28, 1960, Ser. No. 25,461
3 Claims. (Cl. 33—215)

This invention relates to leveling devices, and more particularly, concerns means for leveling flat surfaces, platforms, bases and the like.

An object of this invention is to provide improved leveling means including highly sensitive electro-magnetic systems for indicating minute deviations from the true horizontal.

Another object of this invention is to provide leveling means comprising a pair of similar units adapted to be used in connection with the leveling of a platform or the like; the units including electro-magnetic sensing means, such units being located on the platform in angularly related positions, the sensing action of each unit being independent of the other unit, thereby allowing the platform to be leveled in different directions.

A further object of this invention is to provide leveling means of an electro-magnetic nature; such means being of relatively simple construction and operative in use to produce output signals in response to deviations in the position of the object being levelled, from the true horizontal; said signals being adapted to provide indicator means or to actuate mechanically operated means for adjusting the position of the object being levelled until it assumes a levelled condition.

Other objects of this invention will in part be obvious and in part hereinafter pointed out.

In the drawing, FIG. 1 is a front elevational view of the leveling device embodying the invention;

Figures 1, 2:
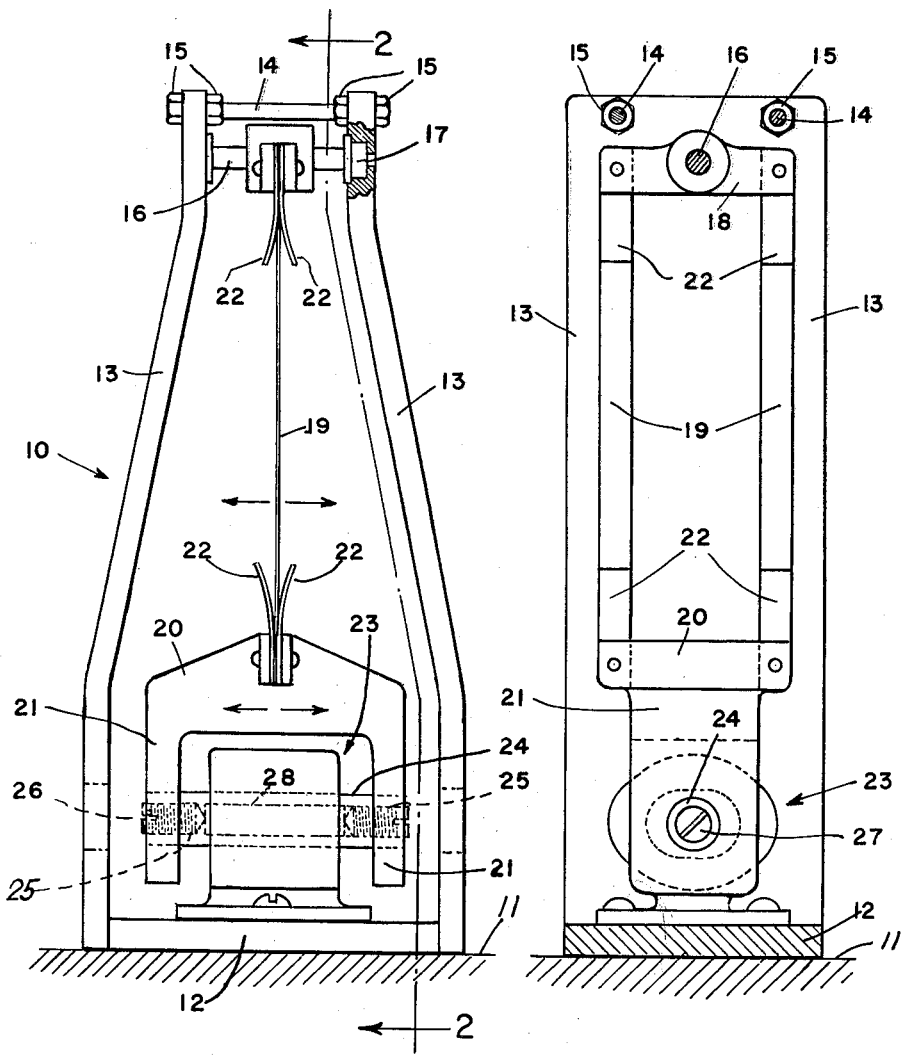
FIG. 2 is a vertical sectional view taken on the line 2—2 of FIG. 1.

Referring in detail to the drawing, and particularly to FIGS. 1 and 2, 10 designates a leveling device embodying the invention; the same being adapted to level various flat surfaces, platforms, bases and the like, generally indicated at 11.

The device 10 comprises a flat base member 12 and a pair of opposed, similar frame members 13 upstanding from opposite ends of base member 12 and suitably secured thereto. Frame members 13 are held in spaced relation at their upper ends by rods 14 threaded at their opposite ends and locked in place by nuts 15. A shaft 16 is horizontally disposed and mounted in bearings 17 located on upper portions of frame members 13.

A cross bar 18 is fixed to shaft 16 and ligatures 19 are fixed at their upper ends to the outer ends of said cross bar 18. Ligatures 19 take the form of thin, flexible metal straps. The lower ends of ligatures 19 are secured to an inverted U-shaped pendulum 20 which comprises a pair of parallel, downwardly extending arm portions 21. Outwardly flared plates 22 are disposed at the terminal ends of ligatures 19 and on the opposite sides thereof to avoid sudden bending or kinking of the thin ligatures as the pendulum member 20 oscillates.

Electromagnetic means is provided for sensing deviations of the pendulum member 20 from the true vertical. To this end, a coil generally indicated at 23, is located on base 12 between pendulum arms 21. A tubular member 24 of non-magnetic material, such as brass, is mounted between the arms 21; the member 24 being substantially coaxial with respect to coil 23. Member 24 is internally threaded at the opposite ends thereof, as at 25, for receiving screws 26, 27, therein. A cylindrical magnetic core 28 is located interiorly of member 24 and is axially slidable therein. Core 28 may be adjusted axially by suitable manipulation of screws 26, 27 which bear at their inner ends on the outer ends of core 28.

Figure 3:
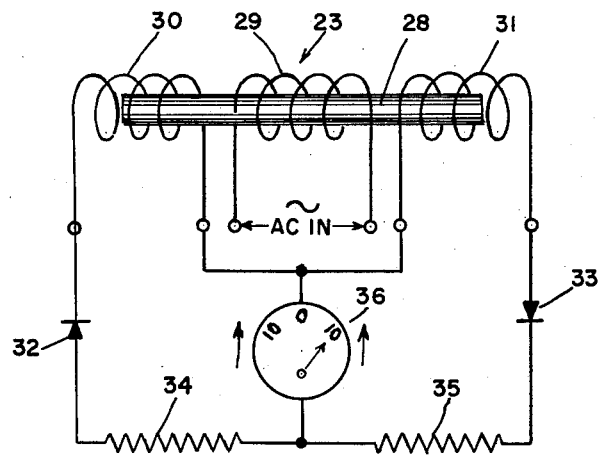
FIG. 3 is a circuit diagram relating to the electro-magnetic portion of said device.

Coil 23 comprises a centrally disposed input winding 29 adapted to be supplied with alternating current; and a pair of output windings 30, 31, respectively located on opposite sides of winding 29, as indicated in FIG. 3. Windings 30, 31 are series connected and have a pair of rectifiers 32, 33 and a pair of resistors 34, 35 in series therewith. A zero center milliameter 36 is connected between the juncture of windings 30, 31, and the juncture of resistors 34, 35.

As shown in FIG. 2, coil 23 may be oval shaped in cross section to freely pass tubular member 24 and its contained core 28. It will be apparent that axial movement of said core 28 by way of movement of pendulum 20, relative to output windings 30, 31, will produce voltages in accordance with the relative axial disposition of core 28 in respect to windings 30, 31.

Accordingly, with device 10 on platform 11, any deviation of the platform from the true horizontal in directions substantially parallel to the oscillatory movement of pendulum 20, will cause said pendulum to swing to positions proportional to the angular extent of such deviations. The movement of pendulum 20 will axially displace core 28 relative to coil windings 30, 31 and unequal voltages will be produced; which in turn will be indicated on milliameter 36. It is understood that with platform 11 in true levelled condition, the outputs of coils 30, 31 will be in balance to give a zero reading on the milliameter.

The levelling device 10 is preferably housed in a container, not shown, which may be filled with a damping fluid such as oil, so as to damp out any continuing oscillations which would occur to sudden or abrupt changes in level conditions.

Figure 4:
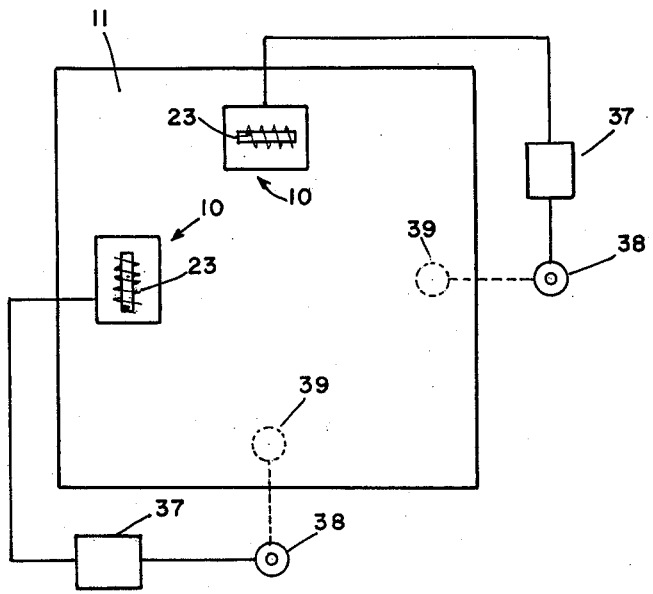
FIG. 4 is a top plan view of a surface to be levelled, using the said devices, and in diagrammatic form.

The platform 11, may then be levelled, by suitable means, not shown, until a zero reading on the milliameter 36 is obtained. However, as shown in FIG. 4, a pair of devices 10 may be located on platform 11, the same being arranged to have their coils 23 in non-parallel relation. With this arrangement, platform 11 may be levelled in two directions, the action of each device 10 being independent of that of the other. Furthermore, the output signals of coils 23 may be amplified by suitable amplifier means indicated at 37; the amplified current being supplied to a motor 38 which actuates raising and lowering means generally indicated at 39, thereby levelling platform 11 in response to the sensing action of devices 10.

As various changes might be made in the embodiment of the invention herein disclosed, without departing from the spirit of the invention, it is understood that all matter herein shown or described shall be deemed illustrative and not limiting except as set forth in the appended claims.

Having thus disclosed my invention, I claim as new and desire to protect by Letters Patent:

1. A leveling device comprising an upright frame member upstanding from a horizontal base member, a rockable member on said frame arranged for movement about a horizontal axis, a pendulum member suspended from said rockable member for swinging movement and rocking movement at right angles to said swinging movement, electromagnetic means comprising a coil mounted on said base member and a magnetic core arranged for axial movement within said coil, and means for mounting said core on lower portions of said pendulum member, said electromagnetic means being operative to provide output signals in response to movements of said pendulum member to positions deviating from the true vertical position thereof, said core mounting means comprising a horizontally disposed tubular member fixed to the lower portion of said pendulum member for slidably receiving said core therein and means on said tubular member for adjusting the axial position of said core relative to said tubular member.

2. A leveling device comprising an upright frame, pendulum suspending means at the upper end of said frame, said suspending means comprising a horizontal shaft on said frame arranged for rocking movement, a cross member on said shaft, a pair of ligature means extending downwardly from the ends of said cross member respectively, bifurcated pendulum means affixed to the lower ends of said ligature means and having depending arm portions, electromagnetic means comprising a coil between the arm portions of said pendulum means having an opening parallel to the axis of said shaft, and a magnetic core mounted on the arm portions of said pendulum means and disposed within the opening of said coil for axial movement relative thereto, said coil having an opening of oval section to permit movement of said core transversely of the axis thereof in response to rocking movement of said shaft, said electromagnetic means being operative to provide output signals in response to movements of said pendulum means to positions deviating from the true vertical position thereof.

3. A levelling device comprising an upright frame member upstanding from a horizontal base member, an inverted U-shaped pendulum member, means for suspending said pendulum member from the upper portion of said frame member, said suspending means comprising a member rockably mounted on said frame member for rocking movement about a horizontal axis, a cross member fixed to said rockable member at right angles thereto, ligature means extending downwardly from the opposite ends of said cross member and fixed at the lower ends thereof to said pendulum member, an electromagnetic coil on said base member and disposed between the arm portions of said pendulum member, a core mounted between the arms of said pendulum member and disposed axially within the opening of said coil, said coil opening having an oval shaped transverse section to allow for lateral movement of said core in directions transversely of the longitudinal axis of said coil in response to rocking movement of said rockable member, said coil and core being operative to provide output signals in response to movements of said pendulum member to positions deviating from the true vertical position thereof.

References Cited in the file of this patent

UNITED STATES PATENTS

| | | |
|---|---|---|
| 63,807 | Morrill | Apr. 16, 1867 |
| 2,427,866 | Macgeorge | Sept. 23, 1947 |
| 2,499,665 | Mestas | Mar. 7, 1950 |
| 2,583,724 | Broding | Jan. 29, 1952 |
| 2,928,183 | Adams | Mar. 15, 1960 |

FOREIGN PATENTS

| | | |
|---|---|---|
| 544,412 | Belgium | Jan. 31, 1956 |